United States Patent [19]

Siccardi

[11] Patent Number: 4,737,103

[45] Date of Patent: * Apr. 12, 1988

[54] FRESH AIR MONITORING AND CONTROLS RELATING THERETO

[76] Inventor: Frank J. Siccardi, 204 Warren Way, Apt. 20, Modesto, Calif. 95356

[ * ] Notice: The portion of the term of this patent subsequent to Sep. 2, 2003 has been disclaimed.

[21] Appl. No.: 885,414

[22] Filed: Jul. 14, 1986

Related U.S. Application Data

[63] Continuation of Ser. No. 748,571, Jun. 24, 1985, Pat. No. 4,609,346.

[51] Int. Cl.$^4$ .......................... F24H 1/00; F27D 19/00
[52] U.S. Cl. ..................................... 432/222; 34/230; 236/15 BD; 98/31.5; 432/51
[58] Field of Search .......................... 432/222, 51, 500; 236/15 BD; 98/31.5, 31.6, 40.03, 38.2, 38.4; 34/230

[56] References Cited

U.S. PATENT DOCUMENTS

| | | | |
|---|---|---|---|
| 3,607,117 | 9/1971 | Shaw | 236/15 BD |
| 4,278,052 | 7/1981 | Sharp | 236/15 BD |
| 4,340,355 | 7/1982 | Nelson et al. | 236/15 BD |
| 4,369,030 | 1/1983 | Siccardi | 432/37 |
| 4,396,371 | 8/1983 | Lorenz et al. | 236/15 BD |
| 4,493,635 | 1/1985 | Ito et al. | 236/15 BD |
| 4,509,914 | 4/1985 | Frick | 236/15 BD |
| 4,532,914 | 8/1985 | Thomas et al. | 432/222 |
| 4,547,144 | 10/1985 | Dietiker et al. | 236/15 BD |

Primary Examiner—Henry C. Yuen
Attorney, Agent, or Firm—Robert R. Keegan

[57] ABSTRACT

There is disclosed an environmental control system for a large volume structure (one horizontal dimension of at least 60 feet) having an air tempering unit including a horizontal cylindrical duct of about three feet diameter with an axial flow propeller fan and motor placed in one end to draw air through the duct and a gaseous fuel burner upstream from the fan with oxygen supplied from the air stream and with combustion products thereof being propelled through the fan. A series of propeller-fan air movers are placed in the structure near ceiling level with the first of the air movers placed about 25 to 50 feet in front of the air tempering unit. The air tempering unit and the air movers are operated by a control unit in response to a cycle timer and various sensor elements including an air velocity sensor for outside air supplied to the air tempering unit and an internal air temperature sensor. For warm or cool outside temperature the air tempering unit and air movers are operated approximately in unison for periods of thirty to one hundred eighty seconds for every 10 minutes. The burner is operated to provide heat when required to maintain the desired inside temperature. For very cold or hot outside temperatures the system runs continuously rather than periodically. In one embodiment an inside air intake supplies from one-tenth to eight-tenths of the air drawn through the fuel burner portion of the duct.

8 Claims, 3 Drawing Sheets

FRESH AIR MONITORING AND CONTROLS RELATING THERETO

This application is a continuation of application Ser. No. 748,571, filed June 24, 1985, now U.S. Pat. No. 4,609,346.

The present invention relates to environmental control systems particularly adapted for large volume structures which supply outside air for cooling or ventilation and which also provide heat to maintain desired minimum air temperature in the structure. In some cases other means of heating or for evaporative or other cooling may be added for more precise control.

Among the structures in which the present environmental system may be employed are enclosures for poultry or other livestock, but the system according to the present invention is possibly more useful in controlling environment in other large structures such as warehouses, manufacturing facilities and greenhouses. The present system has features in common with environmental control systems particularly adapted for poultry houses and other livestock enclosures shown in an application for patent and in F. J. Siccardi U.S. Pat. No. 4,369,030 issued Jan. 18, 1983, which is a continuation in part of U.S. Pat. No. 4,278,423 issued July 14, 1981. The present system is, however, unique and different from the systems described in the foregoing patents because of the wider adaptability of the present system to structures other than enclosures for poultry or the like.

In the preferred environment of the present invention an air tempering unit draws in outside air and recirculates inside air in controlled proportions with the inside air being introduced upstream of the fuel burner. Ample supplies of oxygen in the combustion air are assured by safety features which prevent operation of the system if less than five times the amount of outside air needed for fuel combustion is provided to the burner of the air tempering unit.

Because of the introduction of substantial quantities of outside air which is formed from the building structure through naturally existing or specially provided openings, the circulation of air and uniformity of temperature in the building is greatly enhanced. The present system represents a substantial improvement over environmental control systems having ventilating apparatus with exhaust fans because such exhaust fans tend to cause infiltration of outside air through unavoidable small openings throughout the structure. In the present system air brought into the building is through the air tempering unit and heat losses due to infiltration of cold outside air are greatly reduced.

The circulation provided by ceiling-height air movers in the present invention creates a remarkable uniformity of temperature from floor to ceiling throughout the building. This temperature uniformity also is a prime factor in heat conservation because it avoids abnormally high inside-outside temperature differentials and heat losses at the roof and upper portions of a structure. The air movers are arranged in serial fashion to carry the air to the opposite end of the building from the air tempering unit. It may return by natural convection or with the aid of air movers.

The prior environmental control systems did not achieve the accurate and economical control of temperature, humidity and ventilation of the present invention as they are different in their approach and lack one or more of the distinguishing features of the present system. Prior patents or publications cited in the above-identified patents are representative of such previous environmental control systems. In addition Bohanon U.S. Pat. No. 3,524,399 is representative of large structure environmental control systems for greenhouses, animal enclosures, or the like. The Bohanon heaters did not have outside air ducted to them; an exhaust fan is employed in the ventilation mode; and distribution of air for circulation purposes is through an elongated tube (30) having a series of side openings (32). It will be seen that the Bohanon combination of elements is quite different and controlled differently than that of the present invention which achieves advantages not possible with the prior art represented by the Bohanon patent.

In addition to providing the features and advantages described above it is an object of the present invention to provide an environmental control system for large volume structures which employs circulated warm air (and combustion products) when heat is required to maintain desired temperature, and a substantial portion of the air is outside air which assures more than adequate combustion air for the fuel burners.

It is another object of the present invention to provide an environmental system wherein the air tempering unit providing a slightly above room temperature in large volume at moderate velocity is located only slightly above floor level and a plurality of serially arranged horizontally directed air movers near ceiling level circulate the air without resort to air ducts or other enclosed air pathways.

It is still another object of the present invention to provide an environmental control system wherein an air tempering unit for providing slightly above room temperature air in large volume at moderate velocity is arranged to receive a controllable proportion of inside air and outside air to feed through the gaseous fuel burners and the apparatus is controlled to assure that at least five times the required combustion air is outside air.

Other objects and advantages of the present invention will be apparent from consideration of the following description in conjunction with the appended drawings in which.

Figure 1:
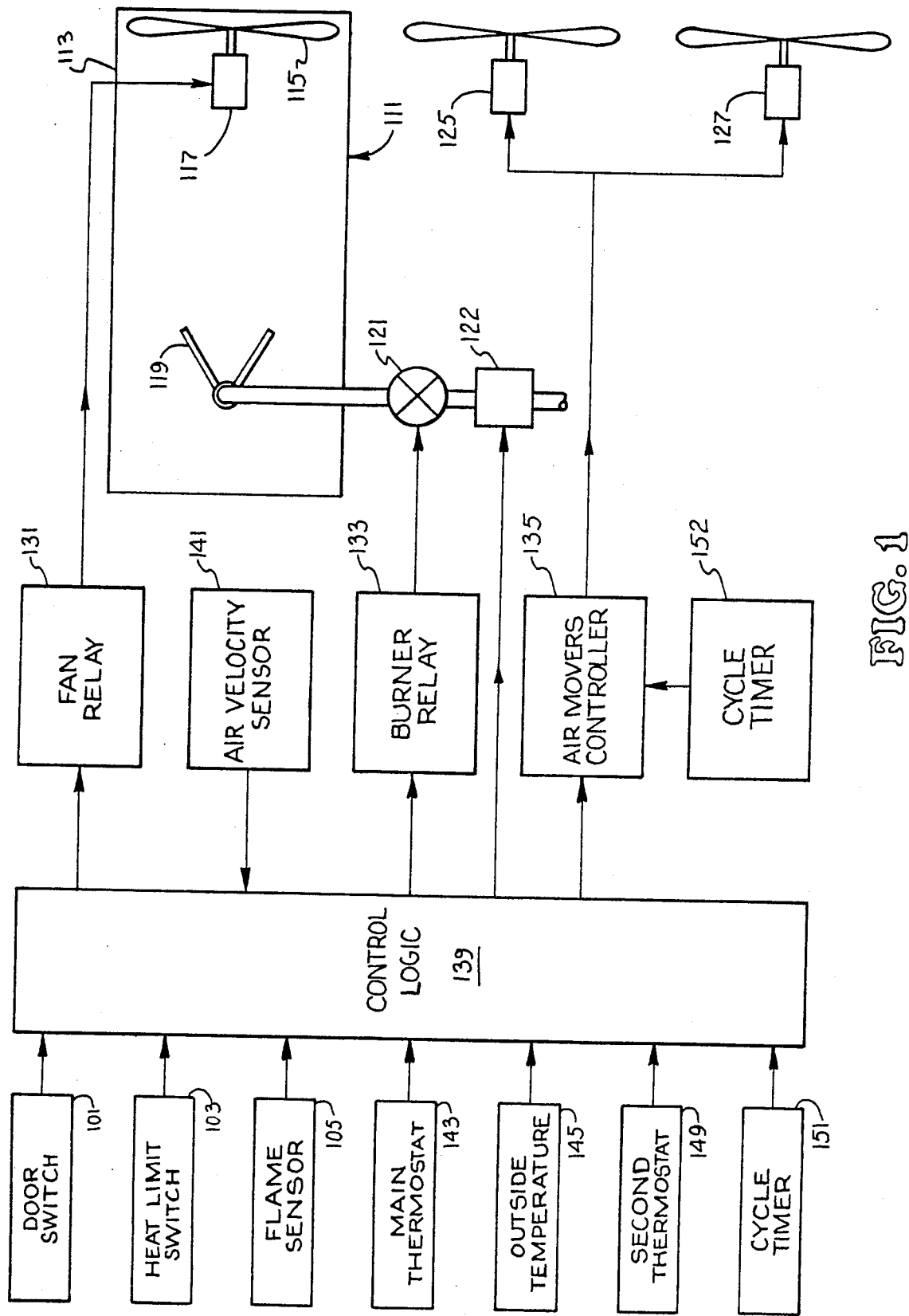
FIG. 1 is a schematic block diagram of the components of an environmental control system according to the present invention.

Referring now to the drawings and particularly to FIG. 1, an air tempering unit 111 comprises a tube or duct 113 having mounted therein a propeller fan 115 driven by an electric motor 117; a grill 116 prevents accidental contact with blades of fan 115. Upstream from the fan 115 in duct 113 is a gaseous fuel burner 119 which is adapted to operate in an airstream of moderate to high velocity with the oxygen required for combustion supplied by the air of the airstream. Such a gaseous fuel burner is shown and described in greater detail in prior F. J. Siccardi U.S. Pat. Nos. 4,278,423 and 4,369,030. Burner 119 may be provided with a standing pilot light operated from the same utility company natural gas line as the burner 119 or by a liquid petroleum gas pilot light (which is less subject to pressure variations, moisture or other problems) supplied from a container at or near the air tempering unit 111. Alternatively the burner 119 may be provided with electronic ignition or both electronic ignition and a standing pilot may be used. Such features are well known in the industry and are shown in the above F. J. Siccardi Patents.

A conventional electrically operated valve 121 provides electrical control of burner 119. Air movers 125 and 127 consist of electrically powered 110 volt or 220 volt propeller fans for example and are preferably operated in synchronism with the operation of air tempering unit 111.

A fan relay 131, a burner relay 133 and an air movers controller 135 are provided to control the various elements of the system from low voltage signals provided by the system controls which include a control logic unit 139 providing control signals to relays 131, 133 and controller 135. An air velocity sensor 141 senses the air velocity of the outside air provided to the burner 119 which is a direct function of the air volume of outside air for the burner 119. In a simple embodiment the air velocity sensor 141 may be a sail-switch adjusted to close a contact when a predetermined air volume, say five times the combustion air requirement for burner 119, is being provided through the outside air opening. Thus failure or partial failure of the fan 115 or an obstruction of the outside air opening will cause the air velocity sensor to provide a signal to the control logic which will in turn cause the burner relay 133 to shut down the fuel burner 119. Optionally alarm or fault indicator light may be caused to operate by the control logic 139 in response to sensing of a fault condition.

Other safety sensors include a door switch 101, a heat limit switch 103 and a flame sensor 105. Door switch 101 signals the control logic 139 to prevent operation of any part of the air tempering unit 111 if the access door 102 is not closed. Heat limit switch 102 also closes down the system when heat at the portion of the duct 113 above burner 119 increases above a temperature for normal operation as might occur in the event of low air velocity or high gas pressure or both.

Flame sensor 105 is employed to detect the presence of a pilot light flame by heat emission or light emission and prevent the opening of valve 121 in the absense of a pilot flame under control of the control logic 139. Alternatively burner 119 may employ a convential pilot monitor cutoff mechanism.

In the preferred embodiment the system is designed to operate the air tempering unit five percent or more of the time under normal conditions. A cycle timer 151 provides a timing signal to the control logic 139 to control cyclic operation of air tempering unit 111. In the illustrated embodiment of FIG. 1 a separate cycle timer 152 is provided for timing air movers 125 and 127 through relay 135. This arrangement of independent timing readily allows air movers 125 and 127 to be set to start or to shut off at times slightly before or after the operation of air tempering unit 111 if desired. Also cycle timer 152 renders the air movers 125 and 127 independent of the operation of control logic 139. At the same time control logic 139 may signal controller 135 to operate air movers 125 and 127 continuously.

The air tempering unit 111 is a high volume air mover which typically will produce a total air flow of from 5,000 to 15,000 cubic feet per minute. Some of the air output of the device may be recirculated interior air, but for certain applications at least one-half of the total air volume will be outside air brought in, and in some cases temperature moderated, by the air tempering device. Specific run times for the air tempering device are described elsewhere herein. However, a general rule of thumb for the pulsed air injection according to the invention is to circulate and/or replace from between 5% and 50% of the volume of air in the active portion of the enclosure with each cycle of high velocity input from the air tempering device. For example, an enclosure volume of 64,000 cubic feet provided with an air tempering device moving 12,000 cubic feet of air per minute would call for a run time of from 16 seconds to 160 seconds by the above general rule of thumb. A periodicity of 5 minutes to 15 minutes is considered most advantageous although periods as short as 2 minutes or as long as 60 minutes would still achieve some of the benefits of the invention. The duty cycle or duty factor is the fractional portion of a period that the air tempering device is operative and may range from 0.04 to 0.7. The preferred embodiment duty factors fall between about 0.1 and about 0.4, however.

Preferably the heating of input air is controlled by interior thermostats out of the direct path of air flow from the air tempering device. In a simple system the air heater is activated if the interior temperature falls below a thermostat setting. One or more additional thermostat settings could be provided to supply additional heat if desired. In any case the fuel supply rate and heat level is manually adjustable.

Temperature sensing signals are provided to the control logic 139 by a main thermostat 143 and a second thermostat 149. Main thermostat 143 may be set to the desired interior temperature of the structure and may also provide an abnormally low temperature signal which would cause the control logic to maintain the air tempering unit 111 in continuous operation and/or increase the fuel flow to burner 119. Second thermostat 149 is employed to detect abnormally high temperature causing the air tempering unit 111 to operate with the burner 119 off and serve to provide ventilating or cooling air in a continuous fashion. The use of thermostats 143 and 149 in the above fashion is arbitrary and any arrangement of thermostats or temperature sensing units providing the desired temperature signals to the control logic 139 will suffice for operation of the system.

Figure 2:
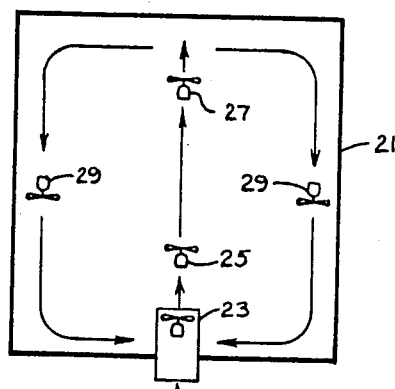
FIG. 2 is a schematic diagram of an exemplary arrangement of components of the system in a large volume structure.
Figure 3:
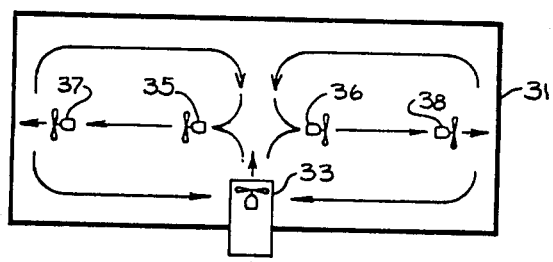
FIG. 3 is a schematic diagram of an alternative physical arrangement of components.
Figure 4:
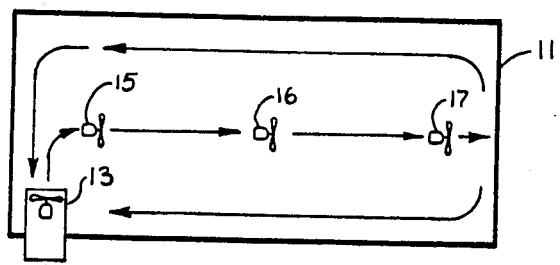
FIG. 4 is a second alternative physical arrangement of components.

FIGS. 2-4 show exemplary layouts of environmental control system equipment according to the invention in large volume structures of various shapes. FIG. 2 shows a building 21 of nearly equal width and length having one air tempering unit 23 placed in the center of one end thereof. FIG. 2 is not accurately drawn to scale but assuming the building to be 150 feet wide and 175 feet long air mover 25 may be placed 50 feet in front of air tempering unit 23 and air mover 27 may be placed 75 feet in front of air mover 25 (approximately 50 feet from the end of building 21). Air movers 28 and 29 are placed approximately 25 feet from the side walls of building 21 and midway of the length of the building and are oriented to move air horizontally and back toward the end of the building where air tempering unit 23 is located. Air movers 28 and 29 are optional and may be eliminated, especially in a narrower building.

FIG. 3 shows placement of the system components in an elongated building where an air tempering unit 33 is located in the center of the long side of the building. On the long axis of the building are arranged central air movers 35 and 36 back to back from 50 to 100 feet apart. Assuming that the building 31 is about 125 feet by 250 feet fans 37 and 38 may be provided about 50 feet from the end walls of building 31. It will be readily apparent that a second air tempering unit may be added in the opposite wall in FIG. 3.

FIG. 4 shows a building 11 having an air tempering unit 13 located in one sidewall near one end thereof. Assuming that building 11 is approximately 125 feet wide by 200 feet long, air movers 15, 16 and 17 may be arranged on the long axis of the building where air mover 15 picks up air from the air tempering unit 13 and air movers 15, 16 and 17 create a high level air current away from air tempering unit 13 down the center of the building. This air current may have a velocity of from 2 feet per second to 7 feet per second. The higher air velocity would be more appropriate for conditions where the air tempering unit is used solely for cooling whereas the lower air velocity is more appropriate for heating conditions. Return of air to the air tempering unit 13 in FIG. 4 as indicated by the arrows is aided by natural convection. The circulation indicated in FIG. 4 also is produced by the intake of the interior air by air tempering unit 13 which is primarily drawn from floor level.

It should be noted that in FIG. 4 as well as FIGS. 2 and 3 the arrows indicating circulation do not represent the circulation pattern at one level in the building. Generally, when the heating function of air tempering unit 13 is employed, warm air near the ceiling of the building will be moved by the air movers, such as 15, 16 and 17, along the central axis of the building while the return of air to the location of the air tempering unit 13 would primarily be near floor level of the building.

Of course, multiple air tempering units may be employed in larger structures and two or more arrangements of air tempering units and air movers such as shown in FIG. 2 may be placed side by side. The air mover arrangements are characterized by a series or chain of at least two air movers on a common axis starting near the output of the air tempering unit and terminating at a wall of the structure. The distance from the air tempering unit to the first air mover and the distance from the first air mover to the structure in the wall may typically be from 30 to 100 feet and the spacing between air movers may typically be 100 feet. However, in large open structures these spacings may be substantially increased. The flexibility in placing air tempering units is especially advantageous in installations in existing buildings where large equipment or other factors may in part dictate arrangement of the system components.

Figure 5:
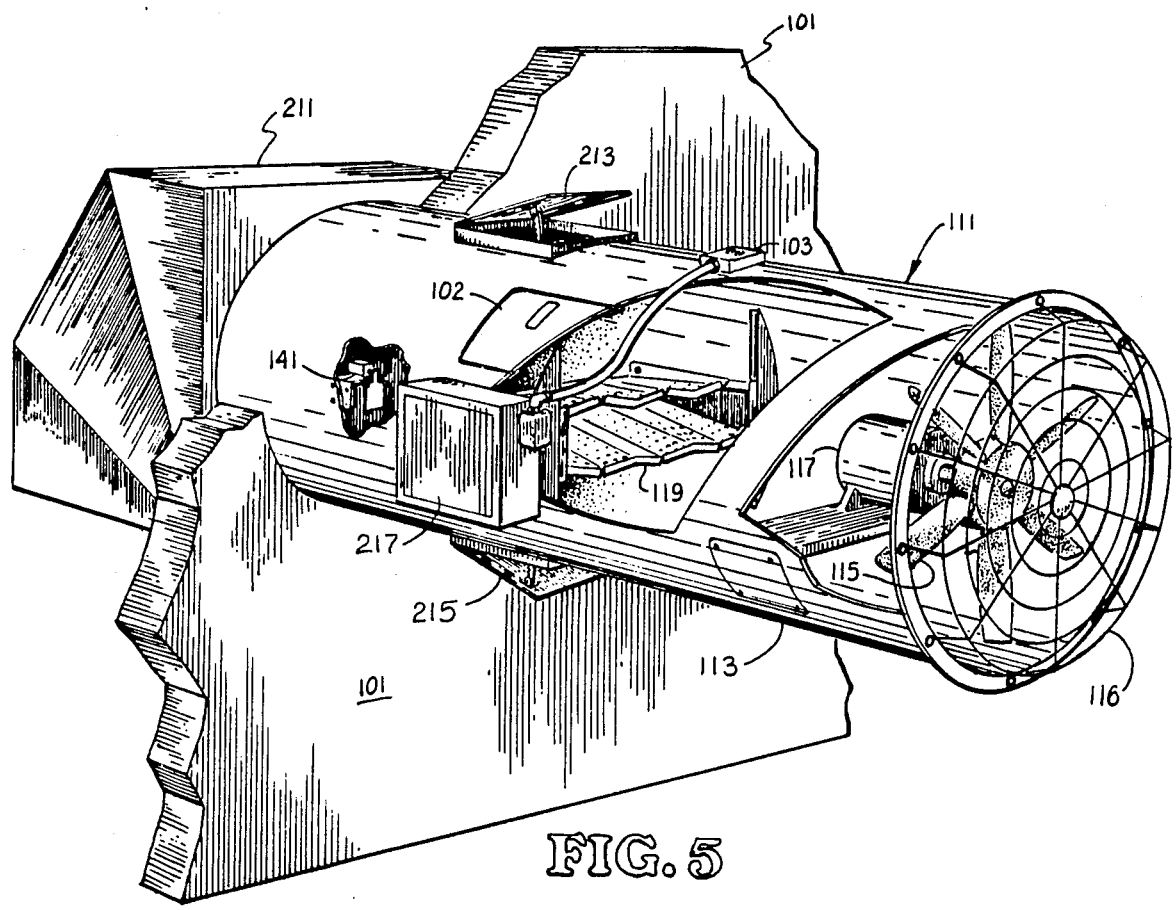
FIG. 5 is a perspective view, partially broken away, showing an air tempering unit suitable for use in the system according to the invention.

In FIG. 5 air tempering unit 111 is shown particularly suitable for the preferred embodiment of the present invention. Other air tempering units such as that shown in F. J. Siccardi U.S. Pat. Nos. 4,278,423 or 4,369,030 would also be suitable for incorporation in a system according to the present invention. Air tempering unit 111 comprises a cylindrical tube 113 which may be approximately three feet in diameter in the front end of which is mounted a propeller fan 115 rotated by electric motor 117. Motor 117 is conveniently mounted within tube 113 and directly connected to fan 115 in this preferred embodiment. It is a characteristic feature of the system according to the invention that the air ejected from the air tempering unit is at moderate temperature and not at the hot air temperature often produced by hot air heating units. Air produced by the air tempering unit of the present invention is preferably below about 100° F. Maintenance of this air temperature permits a standard high efficiency electric motor to be used for motor 117. If the air temperature produced in the air tempering unit 111 were 140° to 150° as commonly found in hot air heating systems motor 117 would overheat (or a more expensive, less efficient motor would be required in the system).

Gaseous fuel burner 119 is mounted in tube 113 upstream of fan 115 and motor 117 and is of the type adapted to be employed in an airstream of from moderate to high velocity. Such fuel burners are known and reference may be had to F. J. Siccardi U.S. Pat. Nos. 4,278,423 or 4,369,030 for a more detailed description thereof, that description being incorporated herein by reference. Air tempering unit 111 is provided with an opening through the exterior wall 101 of the building structure; in the embodiment illustrated, tube 113 extends through wall 101 but a smaller opening in exterior wall 101 may be connected by a duct or otherwise to the inlet end of tube 113. A hood 211 may be provided on the exterior wall 101 which may have a screen on the bottom thereof (not shown) so that airborne papers, leaves or the like will not be drawn in through hood 211. Doors may be provided to close the hood when the system is off. Such an arrangement is known and will not be described in detail; reference may be had to F. J. Siccardi U.S. Pat. No. 4,369,030, incorporated herein by reference, showing such an arrangement.

The suction provided by fan 115 of course is responsible for drawing air through hood 211 and air is also drawn from the interior of the building through adjustable air inlets 213 and 215, each of which may be from one foot to two feet square. In the preferred embodiment shown in FIG. 5 the adjustable air inlets 213 and 215 are upstream from burner 119, an arrangement which is not shown in the above-mentioned F. J. Siccardi Patents or in other prior patents. If openings for inside air are placed in tube 113 downstream from burner 119 the air drawn through such openings is effective to reduce the suction for outside air through hood 211 with the result that the air flow past burner 119 is diminished. This reduced burner air flow is not present in the system illustrated in FIG. 5 where adjustable openings 213 and 215 are upstream from burner 119. Another advantage accrues from having adjustable openings 213 and 215 upstream from burner 119 in that the inside air which is recirculated through tube 113 in part passes through the flame of burner 119 and gaseous pollutants and particulate matter in the air tend to be incinerated and reduced to innocuous gases such as water vapor or carbon dioxide. Thus chemical pollutants which may be produced by chemical porcesses or manufacturing processes may be reduced by the process of recirculation of inside air through the air tempering unit of a system according to the present invention.

The system of the invention is arranged to assure that more than ample combustion air is provided to burner 119 so that oxygen depletion in the air or formation of carbon monoxide will be far below those values determined to be safe and acceptable. To this end an air velocity sensing element 141 is situated in tube 113 in the airstream of outside air from hood 211 and upstream of inside air openings 213 and 215.

Figure 6:
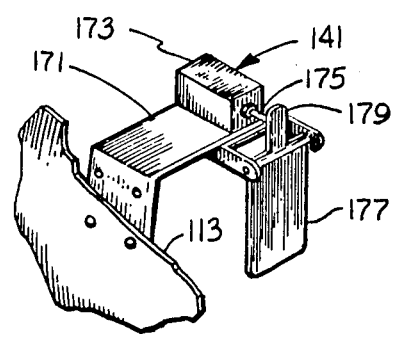
FIG. 6 is an enlarged perspective view of an air velocity sensor shown in FIG. 5.

Referring to FIG. 6 an enlarged view of air velocity sensor 141 is shown. It is spaced away from the side wall of tube 113 on mounting bracket 171. In this embodiment the sensor 141 consists of a simple sailswitch of conventional design which includes a microswitch 173 with a button actuator 175. Sail 177 is pivotally mounted and has a tab 179 extending in a position to contact and actuate the button when sail 177 is deflected from the vertical by a predetermined air velocity which may be from one to twenty feet per second. The air velocity sufficient to actuate the sail switch may be adjusted by adjusting the position of switch 173. The size of the opening from hood 211 to tube 113 may be one foot square. The air velocity sensor 141 is adjusted to operate to close the switch associated therewith when the air velocity is such that the air volume through hood 211 from the outside is a desired value at least five times greater than the volume of fresh air needed to supply combustion oxygen for burner 119 at its maximum fuel consumption rate (commonly about 10 cu. ft. of air is required for one cu. ft. of gas). It can readily be deduced that with outside air being supplied at five times the rate of oxygen consumption by burner 119 oxygen depletion could never reach greater than 20% in a worst case situation. It has also been found that carbon monoxide content of the products of combustion of burner 119 operating in the present system are greatly reduced from the specified maximum acceptable quantities produced with higher fuel consumption relative to air inflow rate.

Access door 102 is provided for inspection or access to burner 119 and is provided with a safety switch (not shown) which prevents operation of the system with door 102 open. A high temperature limit switch 103 is situated generally above burner 119 and is connected to cause the controls to shut down the system in the event of higher than normal temperatures in the burner section of tube 113.

Air tempering unit 111 may be provided with manual or automatic adjustment of air flow by known mechanisms such as that shown in F. J. Siccardi U.S. Pat. No. 4,369,030. The adjustment of air flow may however be accomplished only by adjustable openings 213 and 215 together with prearrangement of opening sizes such as the opening between tube 113 and hood 211. The added complication of automatic air flow adjustments as shown in U.S. Pat. No. 4,369,030 are primarily of value in circumstances where outside air temperature range is of very wide magnitude such as 80° F. or more. Since low temperature air has greater density, a lesser volume is desired; but for moderate temperature variations this effect is insignificant.

Control unit 217 contains the electrical controls and electrically operated valves of the system and may be located on tube 113 as shown in FIG. 5 or may be located at a remote position.

The operation of the system will be understood from the foregoing description, but operation of a preferred and specific embodiment will be described primarily with reference to FIG. 1. The control logic unit 139 may be implemented in various known ways, as by electro-mechanical relays, by integrated circuit logic elements and/or micro-processor control. The cycle timers may be a part of the control logic rather than separate units. A preferred embodiment cycle timer 151 is an electro-mechanical thirty minute cycle timer with thirty second timer tabs (sixty in number). A typical setting of the cycle timer 151 would provide two minutes of on time (four consecutive thirty second intervals) in each ten minute cycle. Preferably the on time period will not be less than thirty consecutive seconds and the timer will be set with no more than thirty percent on time.

In a typical case the air movement capacity of air tempering unit 111 may be approximately 10,000 cubic feet per minute and preferably the capacity of each of the air movers such as 125 and 127 is comparable.

The system is provided with a conventional gas fueled pilot (not shown) which has associated therewith a flame sensor 105 connected to signal control logic 139 to shut down the system and particularly the fuel supply in the absence of a pilot flame. Operation of the system is also dependant on affirmative signals from door switch 101 and heat limit switch 103.

Main thermostat 143 preferably has two temperature settings. One being the target temperature at which it is desired to maintain the interior of the structure and the other being a lower temperature at which the control logic converts the system to constant heating for cold outside temperature conditions. Together with constant heat operation or alternatively to the constant heat operation, control logic 139 may operate fuel modulator valve 122 to increase the fuel supply and the rate at which heat is produced by burner 119 when the inside temperature drops to the lower limit set on thermostat 143. For example the burner may be increased from a 50,000 BTU/HR to a 100,000 BTU/HR rate.

As previously explained air velocity sensor 141 provides a signal to control logic 139 indicating any condition of insufficient combustion air being provided from the outside air inlet of the system, in which event control logic 139 responds and shuts down burner 119. Control logic 139 may be provided with an alarm or indicator to advise operating personnel of an air velocity deficiency or other fault requiring operator attention.

Outside temperature sensor 145 is optional and the outside temperature signal may be utilized to increase the fuel supply rate through modulator 122 under control of the control logic 139.

In the embodiment illustrated in FIG. 1 the air movers 125 and 127 are provided with a controller 135 having a separate cycle timer 152. Cycle timer 152 may be identical to cycle timer 151, but provides flexiblility in offsetting the operation time of the air movers 125 and 127 so that they come on slightly before air tempering unit 111, if desired. Also air movers 125 and 127 may be controlled to operate slightly longer for example thirty seconds longer by the setting of cycle timer 152. Preferably the air movers controller 135 is provided with an input from control logic 139 so that air movers 125 and 127 can be set to continuous run in coordination with air tempering unit 111.

In certain applications the system of the invention will be very effective in providing desired cooling, in greenhouses for example, during daytime hours or other times when inside temperatures rises above a desired range. Second thermostat 149 may be set for 80° F. for example and signals control logic 139 to operate air tempering unit 111 in a cooling mode without operation of burner 119. This mode would normally involve continuous operation of air tempering unit 111 and continuous operation of air movers 125 and 127. This mode of operation is particularly effective where there is evaporative cooling such as in a greenhouse where introduction of outside dry air stimulates evaporation and produces a substantial cooling effect.

If very cold outside air temperatures are encountered in the locale where the system is installed hood 211 may be provided with louver or damper controls so that the volume of air available to machine may be adjusted either manually or automatically. In cold weather the outside air is more dense (more pounds of air per thousand cubic feet) and it is desirable to reduce the amount of fuel required to heat the air by keeping the mass of air relatively constant or in some cases reducing the mass of air, either of which require a reduction in the volume of air in cold weather.

The following example of operation of an air tempering unit in varying outside temperature conditions illustrates the desirability of adjusting the volume of air flow of outside air.

| Outside Air Louvers | Burnrate | Outside Temperature | Discharge Temp | Rise |
|---|---|---|---|---|
| full open | 100,000 BTU/HR | 60° | 80° | +20° |
| full open | 100,000 BTU/HR | 40° | 60° | +20° |
| full open | 100,000 BTU/HR | 20° | 35° | +15° |
| full open | 100,000 BTU/HR | 10° | 20° | +10° |
| part closed | 100,000 BTU/HR | 20° | 70° | +50° |
| part closed | 100,000 BTU/HR | 10° | 60° | +50° |

In addition to adjusting the volume flow of outside air it is of course also possible to adjust the burner fuel consumption rate and BTU output, which is not reflected in the above table.

Preferably the air tempering unit is operated with a high rate of air flow to BTU output. For example a burner designed for 750,000 BTU/HR burn rate would normally be operated with reduced fuel consumption to produce fifty, one hundred or one hundred-fifty thousand BTU/HR burn rates. These would entail fuel consumption of about 50, 100, or 150 cu. ft. per hour. This operation facilitates complete combustion which is reflected in a reduction of carbon monoxide in the combustion products from a rating of about twenty parts per million to about two parts per million.

The present system is particularly well adapted to situations in which there are heat sources of significant magnitude in the structure which are producing either waste heat or which represent auxiliary heaters such as steam or hot water radiant heaters. Other sources of heat may be solar heating in greenhouses, industrial processes in factories, and animal heat in poultry or livestock enclosures. In some cases such as in poultry houses the air discharged from the air tempering unit, while of higher temperature than outside air, may actually be lower in temperature than the inside temperature air. For example poultry house inside temperature may be 80° and the air tempering unit discharge 65° to 70° or poultry house interior temperature may be 70° to 75° and discharge 55° to 60°.

On the other hand in operation in greenhouses, factories or warehouses where heat production from other sources is not as great, a typical main thermostat setting might be 65° and the air tempering unit discharge temperature from 90° to 95°. Fuel supply to the burner 119 may readily be adjusted to obtain a desired increase in air temperature of air passing through the air tempering unit. In the above example the discharge temperature will naturally be affected by outside air temperature and for a night low of 30° to 40° outside temperature the air discharge temperature may be 70 degrees. As described elsewhere the system is configured to change from cycling operation to continuous operation to provide the additional heat necessary to prevent undesirably low interior night time temperatures.

In another example the main thermostat setting may be at 65 degrees which means that burner 119 will operate during the on period for air tempering unit 111 if the temperature is less than 65°. The minimum temperature setting for main thermostat 143 may be 60°. Below this temperature the air tempering unit runs continuously and of course the burner 119 is operating. As the temperature increases and goes above 60° the operation will revert to the cycle timer 151 with the burner 119 still operating. Over 65 degrees burner 119 will cease operating and when the second thermostat setting, for example 75 degrees, is exceeded then continuous running of air tempering unit 111 will be initiated with burner 119 off for maximum cooling.

A typical setting for a large volume industrial structure would be main thermostat heat 65°; main thermostat constant heat 60°; and constant cool 75°.

The basic design improvements and advantages of the present system include injecting a high volume but low velocity of recirculated and outside air into the enclosed space with a warm (60°/90°), neutral (55°/65°), or sub-neutral (10°/15°) below room temperature) air temperature.

Air volume relative to fuel consumption is high so that complete combustion occurs and combustion products in the air are substantially pollution free. The air volume produced by the air tempering unit does not have a great temperature differential relative to the ambient air and it merges with a circulating air flow being produced by the air movers. In contrast a system producing hot air of 120° or more results in the hot air rising to the ceiling and failing to be mixed with the air circulation of the room. The destratification effect of the horizontal air flow the air movers results in an exceedingly low variation in air temperature throughout the enclosed space. This in turn greatly diminishes heat losses by eliminating higher inside-outside temperature differentials near the ceiling or roof.

An added advantage of the moderate temperature air production is that the air tempering unit fan motor may be placed within the tube without adverse consequence since the air temperature will not rise above about 105° F.

It should also be noted that the placement of the fan very near the opening of the air tempering unit results in a broad air stream from the air tempering unit and eliminates any nozzle effect which would produce a high jet air velocity not conductive to through mixing of the air tempering unit output with the circulating air produced by the air movers chain. The arrangement of the air movers is subject to wide variation, but is characterized in all cases by a serial or chain arrangement which one air mover picks up the output of a preceeding air mover and produces a fully circular air movement in the enclosed space which may average in velocity from two feet per second to about five feet per second. An exception to the generally circular air movement situation exists in poultry houses and similar situations where a primary function of the system is to eliminate moist air while maintaining desired environmental temperature. In a poultry house for example relatively larger openings are provided at one or both ends of the poultry house to give a release to warm moist air which has traversed the length of the house. In other environments where moisture removal is not a primary objective large end openings for air are not provided and the air motion is generally circular and returns to the air tempering unit from the far end wall. In such cases the escape of air is generally evenly distributed around the walls and ceiling of the structure thus preserving the circulating air movement pattern produced by the air movers. It may be noted that mean air velocity of five feet per second results in a total air travel of approximately 600 feet in two minutes and thus a two minute cycle of operation is sufficient to achieve complete recirculation in a very large structure. Even larger structures may be arranged to achieve complete recirculation with multiple air tempering units.

The exfiltration of air through the walls of the structure during the cycles of outside air injection appears to have a substantial effect on heat conservation although this has not been precisely quantified. Any structure occupied by humans or by domestic animals must of course be provided with fresh air in some quantity. A typical commercial or industrial building has exhausted air through exhaust fan openings or through combustion product flues and makeup air has been drawn in through infiltration. It was then the task of the heating system to heat the cold infiltrated air. In contrast infiltration is minimized in the present system and air exchange is produced by the air tempering unit forcing escape of air by exfiltration. The latter procedure according to the invention results in markedly more efficient space heating for reasons which are only partially understood. In any case the advantages and improved results of the present system are not dependent upon the theories of operation presented herein, which although believed correct, are based only on empirical observations rather than precise mathematical analysis.

In addition to the variations and modifications to the inventions which have been described or suggested, other variations and modifications will be apparent to those skilled in the art and accordingly the scope of the invention is not to be considered to be limited to those embodiments shown or suggested but is rather to be determined by reference to the appended claims.

What is claimed is:

1. An environmental control system for a large volume structure comprising
   a fan,
   an inlet duct for said fan,
   a motor connected to drive said fan,
   a gaseous fuel burner placed upstream of said fan with combustion products from said burner being propelled through said fan,
   an outside air intake in said structure placed to admit air to said duct upstream of said burner,
   an inside air intake to said duct placed to supply air to the upstream side of said burner,
   an air velocity sensor for detecting the volume air flow rate through said outside air intake, and
   control means responsive to said air velocity sensor for causing fuel to be supplied to said burner only when said air velocity exceeds a predetermined minimum air flow rate at least five times the oxygen requirement for complete combustion of fuel supplied to said burner.

2. Apparatus as recited in claim 1 wherein the heat production rate of said burner is related to the air volume velocity of said fan so as to produce an air temperature increase of from 10° F. to 50° F.

3. Apparatus as recited in claim 1 further including means for cycling said fan with an on time of from 15 to 150 seconds out of a period of 600 seconds.

4. Apparatus as recited in claim 1 further including means for controlling said fan to have a normal duty factor of from 0.05 to 0.25.

5. Apparatus as recited in claim 1 further including a thermostat controlling said fuel burner.

6. Apparatus as recited in claim 1 wherein said fan is an axial flow propellor fan.

7. Apparatus as recited in claim 1 further including air flow control means for controlling the proportion of inside air relative to outside air supplied to said fan.

8. Apparatus as recited in claim 1 wherein said inside air intake is adapted to supply air to the upstream side of said fan at a volume rate at least one-tenth that of outside air.

* * * * *